United States Patent [19]

Peterson

[11] 3,966,150
[45] June 29, 1976

[54] VEHICLE SPEED CONTROL DEVICE

[75] Inventor: William H. Peterson, Homewood, Ill.

[73] Assignee: Pullman Incorporated, Chicago, Ill.

[22] Filed: Jan. 13, 1975

[21] Appl. No.: 540,746

[52] U.S. Cl. ............................. 246/182 B; 137/112
[51] Int. Cl.² ............................................. B61L 3/10
[58] Field of Search ...... 246/182 B, 182 BH, 182 R; 303/21 CF; 137/112, 118, 119

[56] References Cited
UNITED STATES PATENTS

| | | | |
|---|---|---|---|
| 2,982,260 | 5/1961 | Hunter | 137/112 |
| 3,584,214 | 6/1971 | Peterson | 246/182 BH |
| 3,660,653 | 5/1972 | Peterson | 246/182 BH |

Primary Examiner—Stephen G. Kunin
Assistant Examiner—Reinhard J. Eisenzopf
Attorney, Agent, or Firm—Richard J. Myers

[57] ABSTRACT

A railroad car maximum speed limiting device including a railroad car wheel-driven generator and centrifugal speed responsive switch for operating a solenoid valve to supply vacuum to the vehicle brakes from an auxiliary vacuum reservoir after the vehicle has passed a magnetic trip operating a relay to complete the generator circuit, the improvement comprising an air cylinder operated by trainline vacuum for moving the generator and centrifugal speed responsive switch wheel out of engagement with the car wheel for trainline operation, and a special shuttle valve on the cylinder for supplying braking vacuum to the cylinder alternately from the speed control auxiliary vacuum reservoir or from the main conventional vacuum reservoir.

2 Claims, 7 Drawing Figures

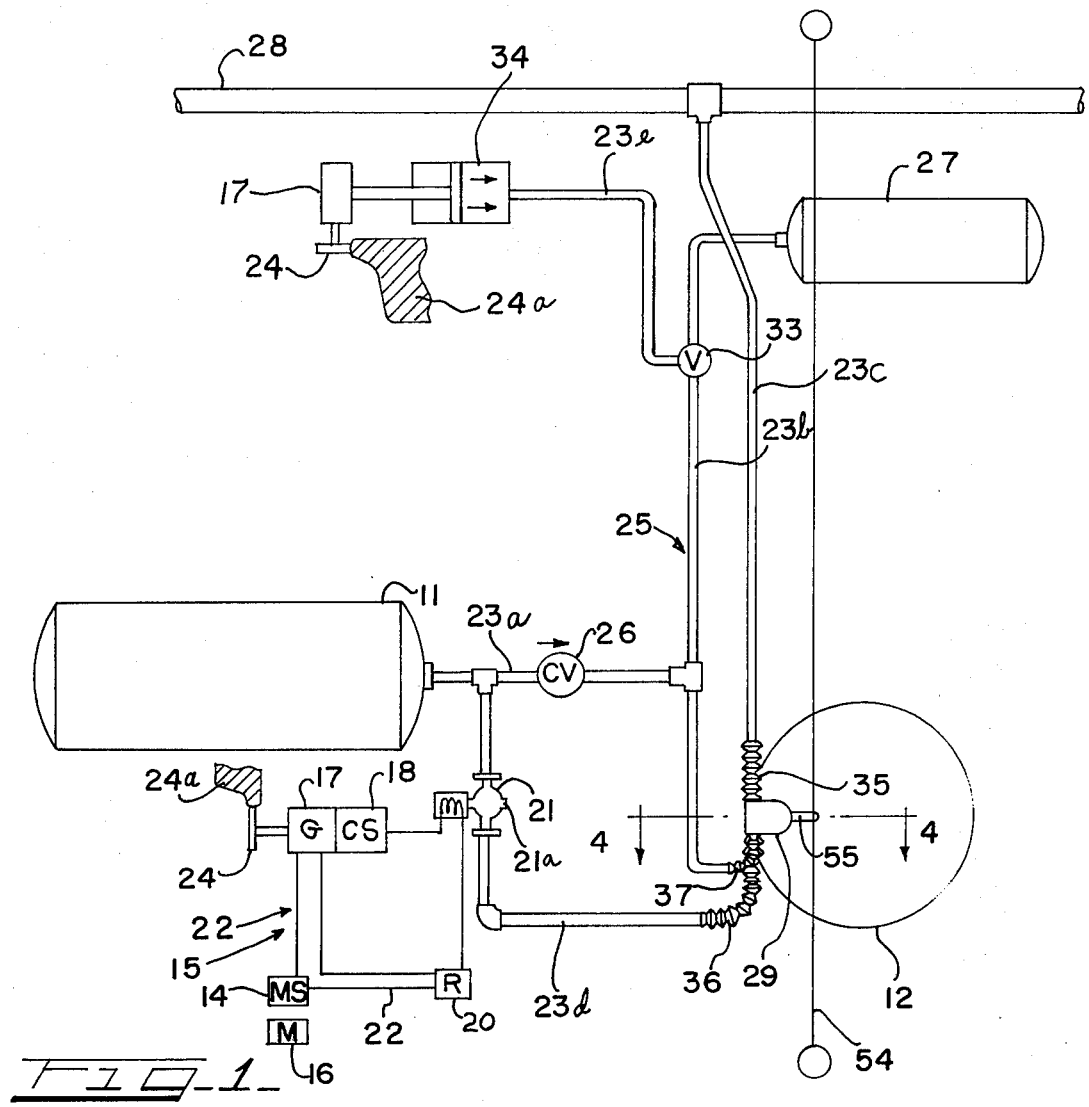
FIG_1
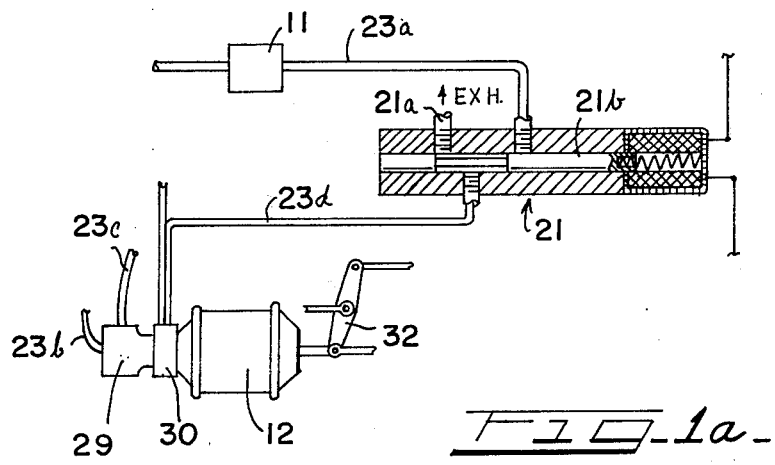
FIG_1a

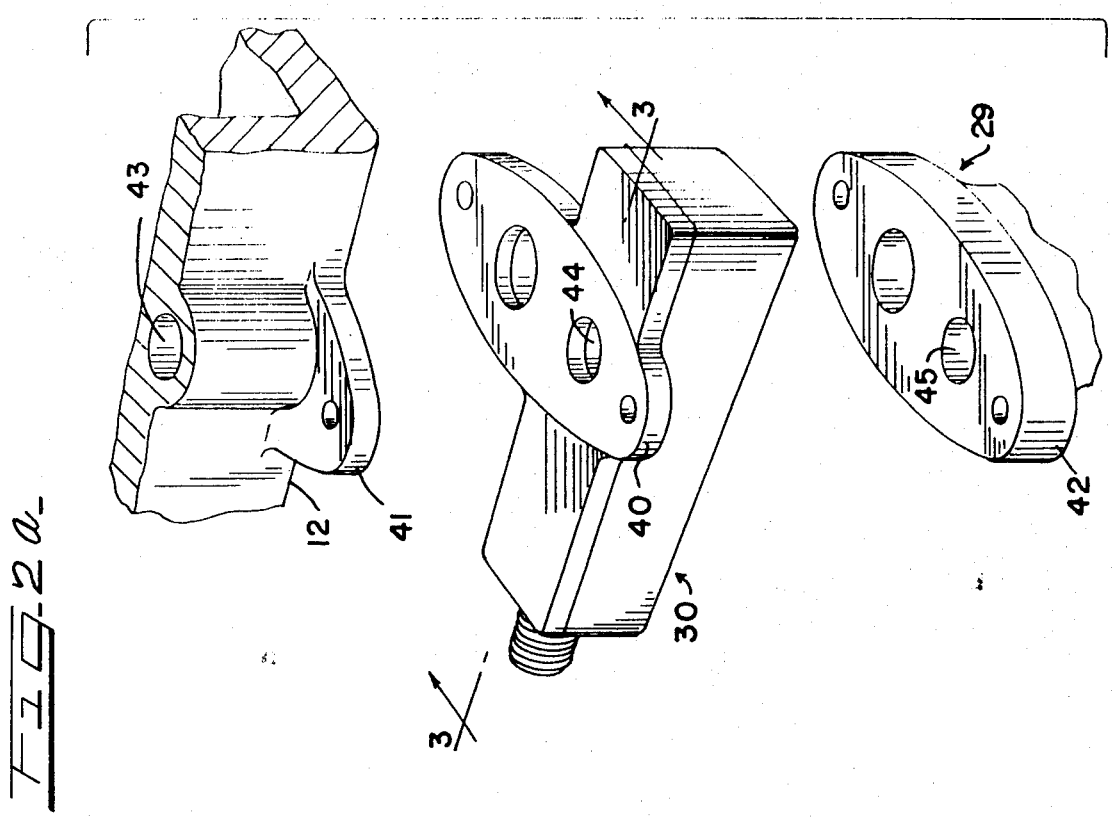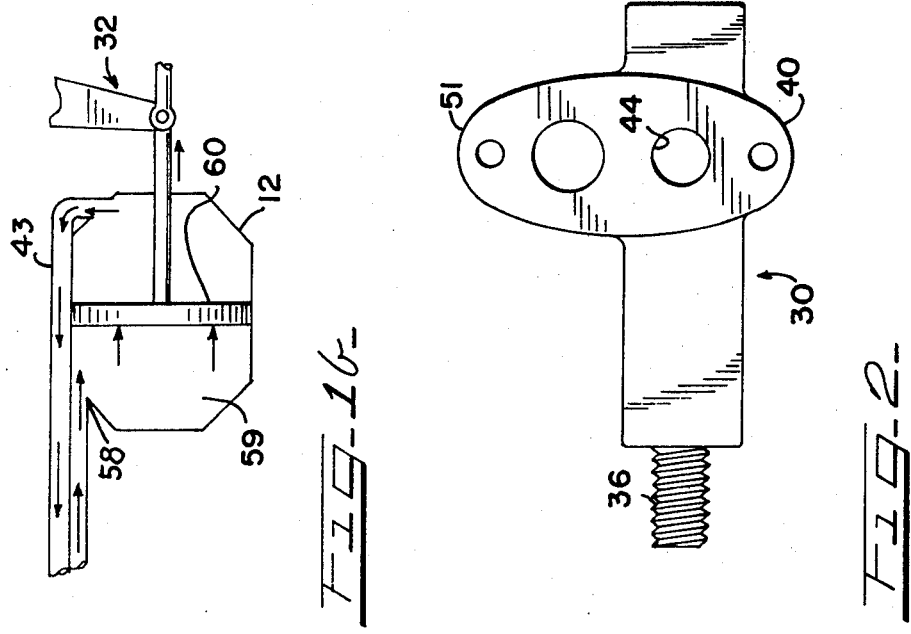

3,966,150

VEHICLE SPEED CONTROL DEVICE

BACKGROUND OF THE INVENTION

1. Field of the Invention.

The field of art to which this invention pertains is the railroad freight car coupling impact control device where it is desirable to control the extent of impact between two railroad freight cars coming into contact with one another and, in particular, to control the extent of impact of a moving railroad car with a standing railroad car in a ladder track of a classification yard.

2. Description of the Prior Art.

One of the ways to control the speed of impact of the railroad car is to employ a freight car mounted speed control device that is tripped by a ground mounted tripping mechanism located in the classification yard. Such an arrangement is shown by my U.S. Pat. Nos. 3,521,052; 3,524,982; 3,527,935; and 3,584,214. However, the prior art does not disclose a railroad car brake system operating under a vacuum and employing a speed control device as disclosed in the aforesaid patents and, in particular, to my U.S. Pat. No. 3,584,214 which is hereby incorporated by reference thereto. The present invention accomplishes the desired result of utilizing a railroad freight car vacuum operated braking system incorporating my speed control device arrangement.

SUMMARY

It is a general object of this invention to provide an improved speed control device which is rendered inoperative during trainline operation and which shall provide alternate sources of vacuum for braking or not braking the vehicle in accordance with classification yard or trainline operations.

It is further an avowed purpose of this invention to provide for a new and improved speed control device for a railroad car in the classification yard where the free rolling speed of the railroad car is controlled or limited to a specific impact speed, for example, three or four miles per hour. The speed control device is made inoperative during trainline operations. Vacuum may be alternately supplied via a shuttle valve by a special vacuum tank for speed control operation or by a vacuum reservoir on the vehicle that is in use during trainline operation.

BRIEF DESCRIPTION OF THE DRAWINGS

FIG. 1 is a schematic view showing the electrical-pneumatic circuitry of the various operational components of the speed control device and the pneumatic brake components for the railroad freight car;

FIG. 1a is a schematic view of the solenoid valve;

FIG. 1b is a schematic diagram of the brake cylinder;

FIG. 2 is an enlarged view of the vacuum operated shuttle valve of the invention;

FIG. 2a is an exploded perspective view of the assembly of portions of the brake cylinder, special shuttle valve, and ball valve;

FIG. 3 is a sectional view taken along line 3—3 of FIG. 2a; and

DESCRIPTION OF THE PREFERRED EMBODIMENT

Figure 3:
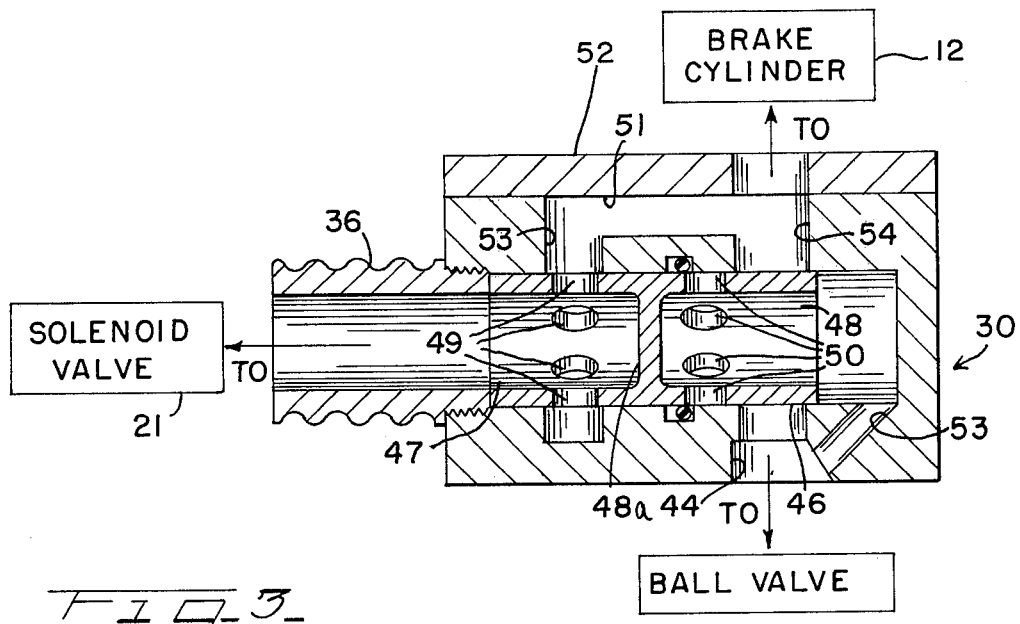

With reference to U.S. Pat. No. 3,584,214, there is shown an end portion of a hopper car with the usual hopper end structure. The end deck portion of the hopper car carries a reservoir tank, vehicle brake cylinder and brake rigging for applying the brakes to the vehicle.

With reference to the drawings and in particular to FIG. 1, the speed of the rolling car or vehicle within a classification yard is controlled by a railroad freight car mounted speed control device 15 operative on the vehicle brakes, the operation and general arrangement of said device 15 being generally shown and described in my co-pending U.S. Pat. No. 3,524,982 granted on Aug. 18, 1970.

The speed control device is provided with conditioning means or magnetic responsive switch means 14 and relay means 20 mounted on the end portion of the truck frame (not shown) and so placed adjacent the rail means (not shown) as to be influenced magnetically by magnet or off-vehicle tripping means 16 as the car moves by the magnet 16. The speed control device is further provided with a railroad car wheel-driven generator means 17 which is a direct current generator with a permanent magnet field, a railroad car wheel-driven centrifugal speed responsive switch means 18, and a solenoid valve means 21, as seen in FIG. 1. The generator 17, the speed responsive switch means 18, the relay means 20 and the solenoid valve means 21 are all in series in the electrical circuit 22. When the switch means 18 closes the circuit 22 and the relay means 20 is in the energized condition the solenoid valve means 21 is opened to allow air under a negative pressure or vacuum from the additional reservoir tank 11 to go to the brake cylinder means 12 for applying the vehicle brakes. The relay means 20 will be energized when the magnet means 16 actuates the magnetic responsive reed switch or relay actuating switch 14 to complete the circuit 22. Centrifugal switch means 18 is actuated to complete the circuit 22 when the vehicle speed exceeds 4 m.p.h. The generator 17 is driven by the drive means 24 which also drives the switch means 18. The drive means 24 is driven by the railroad car wheel 24a.

In FIG. 1, it is seen that the electric circuit 22 is coupled with a pneumatic circuit 25 through valve means 21 (see FIGS. 1 and 1a) of the type used in U.S. Pat. No. 3,524,982 and herein incorporated by reference thereto. The valve means 21 connects with the extra reservoir tank 11, added to the car and charged with a vacuum or negative air pressure through the check valve 26 and pneumatic lines 23a and 23b and 28 when the existing main reservoir tank 27 is charged during train operation by trainline 28 and line 23c by way of the conventional ball valve means 29 (see FIGS. 1, 2a and 4) of a vacuum air system. A special suttle valve means 30 (2, 2a, 3 and 4) is interposed between the brake cylinder 12 having brake rigging 32 connected thereto and the ball valve means 29 (see FIGS. 1, 2a and 4). The shuttle valve means 30, in turn, is connected by line 23d with the solenoid valve means 21.

Line 23b is provided with a saddle valve 33 allowing one way communication of vacuum from reservoir tank 27 to pneumatic cylinder means 34 by way of a line 23e, whereby the generator 17 is lifted from the car wheel 24a during train operation (during charging of the trainline and while in line service). The speed control device 15 is thereby kept out of engagement with the car wheel during trainline operation by pressure in the cylinder means as shown in U.S. Pat. No. 3,584,214.

Line 23c has a flexible hose 35 that connects with the ball valve means 29 and line 23d has a flexible hose 36 that connects with the shuttle valve means 30 and line 23b has a flexible hose 37 that connects with the ball valve means 29. These flexible hoses 35, 36, and 37 are necessary since the connector components may require some movement with respect to one another. The arrow above valve 26 indicates the uni-directional flow in the valve. The arrows in cylinder means 34 indicates the direction of movement of the cylinder means during train operation.

Figure 4:
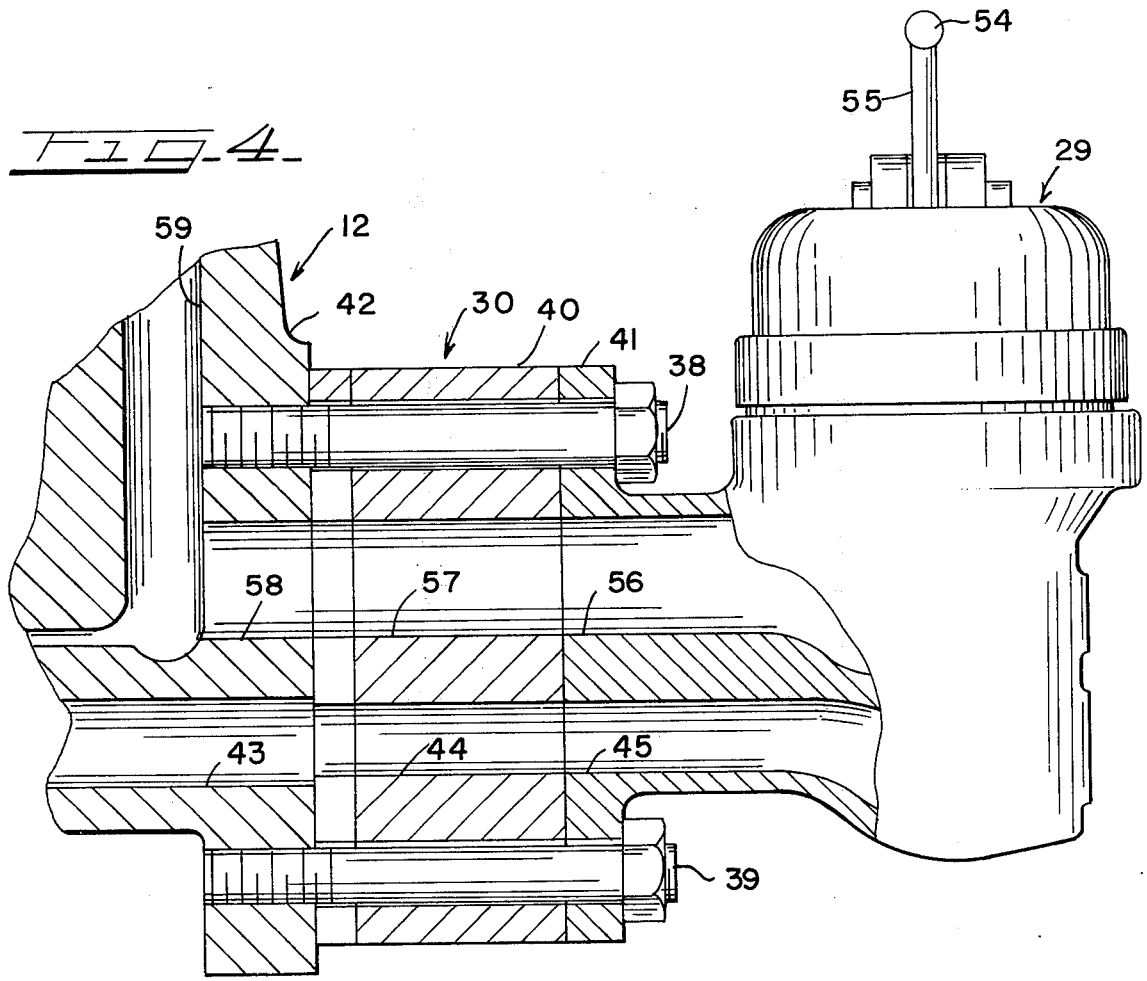
FIG. 4 is a view illustrating the coupling of brake cylinder, the shuttle valve, and ball valve structure of a railroad freight brake arrangement using a vacuum braking system.

With reference now to FIGS. 1–4 and 1a, 1b it is shown that the special shuttle valve means 30 is mounted between the brake cylinder means 12 and the ball valve means 29 by bolt means 38, 39 passing through holes in their aligned flange members 40, 41, 42 (FIGS. 2a and 4). The respective brake cylinder vacuum passage 43, shuttle valve vacuum passage 44 and the ball valve vacuum passage 45 are all in alignment with one another for the passage of vacuum therethrough. The shuttle valve vacuum passage 44 however has a three way shuttle valve member or slide valve member 46 (see FIGS. 1–4 and 1a, 2a). The shuttle member 46 has two separate walled off open ended chambers 47, 48 defined by wall 48a and having ports 49, 50 respectively for communicating with housing passage 51 in valve housing 52 alternately via housing ports 53 and 54 (see FIG. 3). As view in FIG. 1a the solenoid valve 21 is in the de-energized condition. When the solenoid valve is energized as when the car speed exceeds 4 m.p.h., a vacuum is delivered by additional reservoir tank 11 for car braking. The solenoid valve is de-energized when the car is traveling less than 4 m.p.h. and the brake cylinder 12 is open to atmosphere via solenoid exhaust part 21a. The housing passage 51 can communicate selectively with the shuttle valve vacuum passage 44 to the brake cylinder means 12 and the ball valve means 29 via ports 50. The chamber 47 communicates with the solenoid valve means 21. The chamber 47 communicates with housing passage 51 and to thence to brake cylinder 12 in one position of the valve spool 46 (as shown in FIG. 3) but the chamber 47 does not communicate with the ball valve means 29. The chamber 48 communicates with the brake cylinder means 12 and the ball valve means 29 in the other position (not shown) of the shuttle valve member 46 when it is moved to the extreme right against right wall 52a of the housing 52. If a vacuum exists in line 23d between the solenoid valve 21 and the shuttle valve 30 and the slide valve member 46 is positioned as shown in FIG. 3, then the brake cylinder 12 can be in communication with the additional reservoir tank 11 with the speed control device 15 controlling the braking of the speed of the car. When the slide valve member 46 is moved to the extreme right the ball valve means can supply vacuum to the brake cylinder when a vacuum exists in line 23b and the solenoid valve is blocked from communication with the brake cylinder.

The ball valve means 29 has a lever 54 that is operated by the brake release rod 55. Passages 56, 57 and 58 in the ball valve, shuttle valve and brake cylinder respectively are open passages that communicate with one another and with the atmosphere and the piston face side 59 of the brake cylinder 12 (see FIG. 1b) and vacuum or negative pressure can act on the other side 60 of the piston of the brake cylinder 12. When the trainline 28 is disconnected in a vacuum system and bled to atmosphere, the railroad car brakes are applied at once. This is because the ball valve means 29, when subject to atmospheric pressure in line 23c which was previously under a vacuum or negative pressure, has valving that can be similar to shuttle valve 30, that is responsive to the increase pressure in line 23c and moves to allow communication between the main reservoir 27 (which is under a vacuum or negative pressure) to communicate a vacuum to the brake cylinder 12. This is conventional vacuum brake operation and takes the place of the AB valve used commonly in positive pressure car brake systems.

In order to move the car for switching operations, the brake release rod 55 is moved which acts on the ball valve means 29 whereby its valving is now positioned to subject the brake cylinder 12 to atmosphere terminating the supply of vacuum or negative pressure from the main reservoir 27. This releases the brakes for car switching operations. The right side (chamber 48) of the shuttle valve 30 is now under atmospheric pressure. The left side of valve 30 (chamber 47) is under atmospheric pressure since solenoid valve 21 is not energized (see FIG. 3). When the solenoid valve 21 is energized and the left side of the shuttle valve 30 is introduced to the vacuum from the additional reservoir 11 the valve spool 21b of valve 21 moves to the left or the position shown in FIG. 3. The brake cylinder 12 is now subject to the vacuum from the additional reservoir 11 and not the main reservoir 27 via the passageway 44 to the ball valve 29. When the railroad car has fallen below 4 m.p.h. the solenoid valve is de-energized and the left side (chamber 47) is open to atmospheric pressure. The shuttle valve 30, as viewed in FIG. 3, moves to the right and vacuum is no longer supplied to chamber 60 of the brake cylinder and now the brake cylinder chamber 60 is subject to atmospheric pressure from via the valving of the ball valve means 29. The car brakes are no longer applied. The car being coupled to another car or cars is put in service with the trainlines of the cars being connected. Now during regular trainline or "in service" operation, the braking operation of the car occurs by supplying vacuum from the main reservoir 27 to the brake cylinder 12. Thus the shuttle valve isolates the pneumatic circuit of one reservoir 11 or 27 from the other, depending on which is operating.

What is claimed is:
1. A vehicle speed control device for limiting the speed of a railroad car comprising
a wheel driven generator adapted to engage a wheel of the railroad car,
a speed responsive switch attached to said generator,
magnetically operated switch means,
tripping means mounted off the railroad car to actuate the magnetically operated switch means,
a first reservoir tank of fluid under a vacuum,
shuttle valve means,
speed control valve means connected to the first reservoir and the shuttle valve means, and actuated by the generator through the speed responsive switch and the magnetically operated switch means to selectively supply fluid under a vacuum from the first reservoir to the shuttle valve means,
a second reservoir tank of fluid under a vacuum, a trainline of fluid under a vacuum connected to charge both said first and second reservoir tanks with a vacuum, car wheel brakes, a brake cylinder for operating the car wheel brakes, said brake cylinder having a piston therein, and ball valve means mounted on the shuttle valve means which is mounted on the brake cylinder, said shuttle valve means and said ball valve means having a first common passage communicating with one side of the piston in said brake cylinder for introducing a vacuum into said brake cylinder and having a second common passage for introducing atmospheric pressure to the other side of said piston in said brake cylinder, said shuttle valve means responsive to the fluid pressure from both said speed control valve and from said ball valve means to selectively supply vacuum to said brake cylinder either from said first reservoir through said speed control valves or from said reservoir through said ball valve means.

2. The invention according to claim 1, and said shuttle valve means including:

a valve housing, a movable spool valve member within said valve housing, a first chamber communicating with said speed control valve means and second valve chamber communicating with said ball valve means, said first chamber having first port means selectively communicating with the associated brake cylinder and said second valve chamber having second port means selectively communicating with the associated brake cylinder in a second position, and said valve member being movable between said first and second chambers in accordance with vacuum conditions of said speed control valve means and said ball valve means.

* * * * *